(12) United States Patent
Veys et al.

(10) Patent No.: US 11,415,507 B2
(45) Date of Patent: Aug. 16, 2022

(54) APPARATUS AND METHOD FOR DETERMINING SPECTRAL INFORMATION

(71) Applicant: The University of Manchester, Manchester (GB)

(72) Inventors: Charles Marcel Henry Veys, Manchester (GB); Bruce Donaldson Grieve, Huddersfield (GB)

(73) Assignee: The University of Manchester, Manchester (GB)

( * ) Notice: Subject to any disclaimer, the term of this patent is extended or adjusted under 35 U.S.C. 154(b) by 98 days.

(21) Appl. No.: 16/955,724

(22) PCT Filed: Dec. 20, 2018

(86) PCT No.: PCT/GB2018/053711
§ 371 (c)(1),
(2) Date: Jun. 18, 2020

(87) PCT Pub. No.: WO2019/122891
PCT Pub. Date: Jun. 27, 2019

(65) Prior Publication Data
US 2021/0010930 A1    Jan. 14, 2021

(30) Foreign Application Priority Data
Dec. 20, 2017  (GB) .................................... 1721451

(51) Int. Cl.
*G01N 21/35* (2014.01)
*G01B 11/22* (2006.01)
*G06T 7/521* (2017.01)
(52) U.S. Cl.
CPC ............. *G01N 21/35* (2013.01); *G01B 11/22* (2013.01); *G06T 7/521* (2017.01); *G01N 2201/0612* (2013.01); *G01N 2201/0635* (2013.01)

(58) Field of Classification Search
CPC ...... G01N 21/35; G01N 21/31; G01N 21/255; G01N 2201/0612; G01N 2201/0635;
(Continued)

(56) References Cited

U.S. PATENT DOCUMENTS 6,376,818 B1 *  4/2002  Wilson ............... G02B 21/0044
                                          250/201.3
9,945,828 B1    4/2018  Poling et al.
(Continued)

FOREIGN PATENT DOCUMENTS

CN          104463967 A      3/2015
CN          104897616 A      9/2015
(Continued)

OTHER PUBLICATIONS

English Translation of Description for Li et al. (CN 104897616 A) from espacenet, Sep. 9, 2015. (Year: 2015).*
(Continued)

*Primary Examiner* — Matthew K Kwan
(74) *Attorney, Agent, or Firm* — Seed IP Law Group LLP

(57) ABSTRACT

Embodiments of the present invention provide an apparatus for determining spectral information of a three-dimensional object, comprising a cavity (110) for location in relation to the object, an imaging light source (120) located in relation to the cavity, wherein the imaging source is controllable to selectively emit light in a plurality of wavelength ranges, structured light source (130) for emitting structured illumination toward the object, wherein the structured light source comprises a plurality of illumination devices arranged around the cavity, one or more imaging devices (140) for generating image data relating to at least a portion of the object, a control unit, wherein the control unit (1100) is arranged to control the structured light source to emit the structured illumination and to control the imaging light
(Continued)

source to emit light in a selected one or more of the plurality of wavelength ranges, a data storage unit (1120) arranged to store image data corresponding to the structured illumination and each of the selected one or more of the plurality of wavelength ranges, and processing means (1110) arranged to determine depth information relating to at least a portion of the object in dependence on the image data corresponding to the structured illumination stored in the data storage means.

21 Claims, 11 Drawing Sheets

(58) Field of Classification Search
CPC ... G01N 2021/1782; G01N 2021/8466; G01B 11/22; G01B 11/25; G06T 7/521; G06T 7/586; G01J 3/2823; G01J 3/10; G01J 2003/102; G01J 2003/104
USPC ............................................. 348/135
See application file for complete search history.

(56) References Cited

U.S. PATENT DOCUMENTS

| | | |
|---|---|---|
| 2006/0152738 A1* | 7/2006 | Iwasaki ............... G01B 11/25 356/602 |
| 2014/0028800 A1 | 1/2014 | Tin |
| 2016/0278678 A1 | 9/2016 | Valdes et al. |
| 2017/0124715 A1 | 5/2017 | Tin |
| 2018/0035605 A1 | 2/2018 | Guan et al. |

FOREIGN PATENT DOCUMENTS

| | | |
|---|---|---|
| CN | 206132218 U | 4/2017 |
| CN | 106908445 A | 6/2017 |
| WO | 2017/205857 | 11/2017 |

OTHER PUBLICATIONS

Nov. 9, 2016 Inverse Square Law page from Wikipedia. (Year: 2016).*

Behmann et al. ("Generation and Application of Hyperspectral 3D Plant Models"), ECCV 2014, first online Mar. 19, 2015. (Year: 2015).*

Goel, M., et al., "HyperCam: Hyperspectral Imaging for Ubiquitous Computing Applications," *Proceedings of the 2015 ACM International Joint Conference on Pervasive and Ubiquitous Computing*, Sep. 2015, pp. 145-156.

"Inverse-Square Law," *Wikipedia*, [https://en.wikipedia.org/w/index.php?title=Inverse-squre_law&oldid=814265728], Dec. 2017, 4 pages.

Behmann, J., et al., "Generation and Application of Hyperspectral 3D Plant Models: Methods and Challenges," *Vision and Applications* 27:611-624, 2016.

Bellasio, C., et al., "Computer Reconstruction of Plant Growth and Chlorophyll Fluorescence Emission in Three Spatial Dimensions," *Sensors* 12:1052-1071, 2012.

Veys, C., et al., "An Ultra-Low-Cost Active Multispectral Crop Diagnostics Device," *2017 IEEE Sensors*, Oct. 2017, 3 pages.

\* cited by examiner

APPARATUS AND METHOD FOR DETERMINING SPECTRAL INFORMATION

BACKGROUND

Multispectral imaging relates to capturing image data at a plurality of specific wavelengths or wavelength bands. The imaging may relate to an object such as a biological object. Multispectral imaging has been applied to plants to determine a status of the plant. In an active multispectral imaging system, the object such as plant tissue is selectively illuminated with light in a plurality of predetermined wavelength ranges and illumination reflected from the sample, i.e. the plant tissue, is recorded by an imaging device.

Plant tissue optics are complex due to the variability in both composition and orientation of the tissue sample such as a leaf Incident radiation, i.e. light, comes into contact with the plant surface, where a portion of the incident radiation reflects off a waxy cuticle of the plant in the form of specular reflectance, whilst the rest is refracted within the plant tissue. It is the latter interaction that contains information about the internal plant tissue composition. The dispersed light is either transmitted through the leaf, absorbed within the cell structure or reflected in the form of backscattered reflection. As the structure of leaf tissue is comprised of multiple layers, with varying composition, wavelengths penetrate to different depths where light that reaches the spongy mesophyll is scattered. This behaviour goes some way in explaining why plant tissue exhibits non-Lambertian reflectance, explaining why plant tissue samples are often fixed in place before being imaged in a lab environment. However, fixing a plant tissue sample in place to address issues associated with orientation of the sample is time consuming and may limit usefulness of multispectral imaging.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
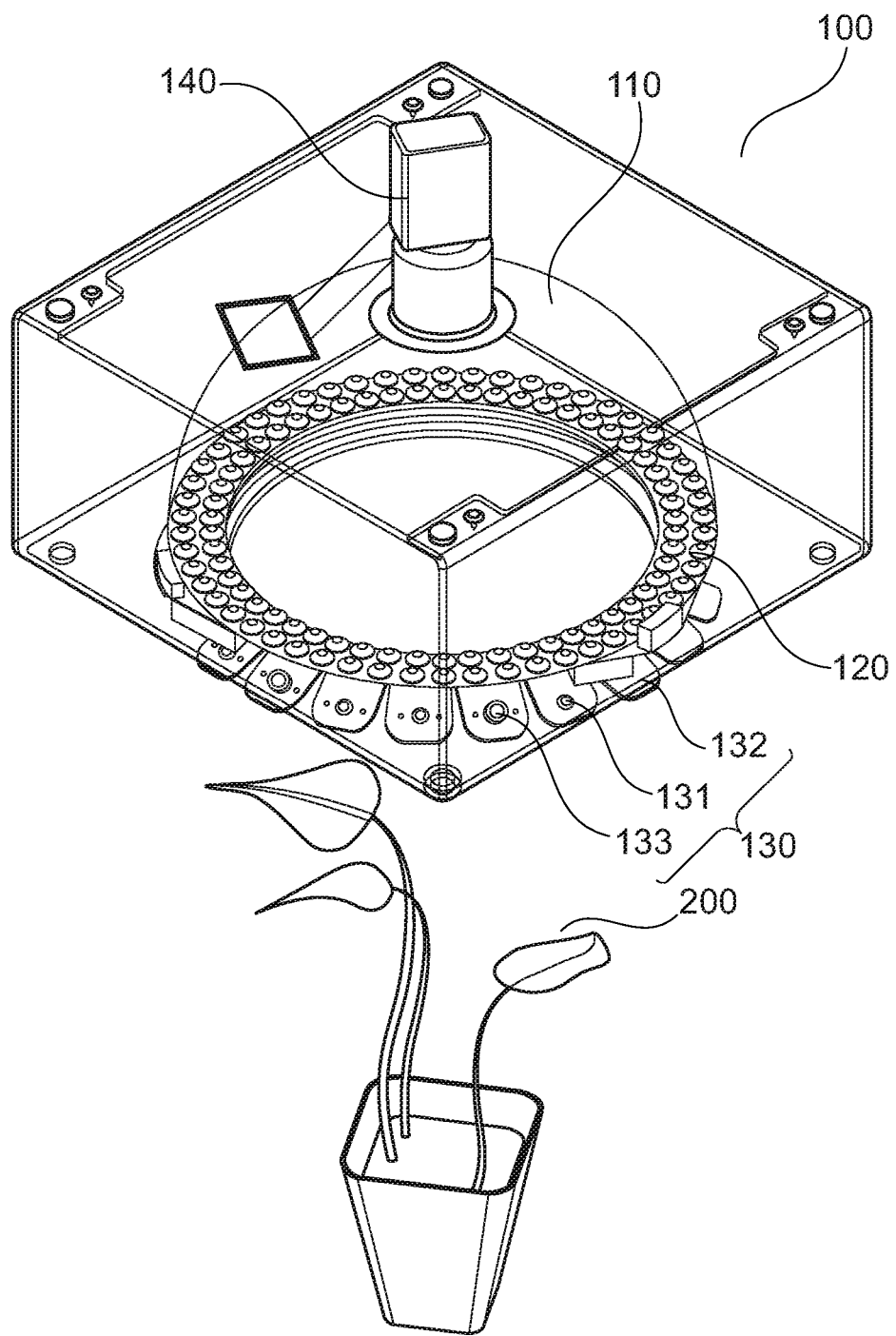
FIG. 1 shows a perspective view of an apparatus according to an embodiment of the invention.

FIG. 1 illustrates an apparatus 100 according to an embodiment of the invention. The apparatus 100 is an apparatus 100 for determining spectral information of a three-dimensional object 200. As shown in FIG. 1, the three-dimensional object 200 may be a biological structure, such as a plant 200. The object may comprise a plurality of one or more generally planar surfaces which, in the example, are leaves of the plant 200. The apparatus 100 is arranged to, in use, determine the spectral information relating at least in part to the planar surfaces, such as the leaves. Embodiments of the information are arranged to determine orientation information of the one or more planar surfaces, where the orientation information is indicative of an orientation of the one or more planar surfaces with respect to the apparatus 100, as will be explained. The orientation information may be used to at least partly correct for the orientation of the planar surfaces such that the spectral information may be improved. Hereinafter the object 200 will be referred to as a plant 200 with it being appreciated that this is not limiting.

The apparatus 100 comprises a cavity 110. The cavity 110 is provided for being located, in use, in relation to the plant 200. In particular the cavity 110 may be located generally above the plant 200. The cavity 110 comprises a hemisphere 110, or portion thereof, which is located having a major opening, i.e. generally along a central axis of a sphere corresponding to the hemisphere, for facing the plant 200. A minor, i.e. smaller opening, is provided at an opposing side of the hemisphere 110 from the major opening for permitting mounting of one or more imaging devices 140 for viewing, i.e. receiving radiation from, an interior of the cavity 110.

An internal surface of the cavity 110, or hemisphere 110, may be coated with a diffuse reflecting material. An example of such a diffuse reflecting material is barium sulphate in a titanium dioxide and latex support, although it will be appreciated that other materials may be used.

The apparatus 100 comprises an imaging light source 120. The imaging light source 120 is located in relation to the cavity 110. The imaging light source 120 is controllable to selectively emit light in a plurality of selected wavelength ranges or bands within an overall imaging wavelength range.

Figure 3:
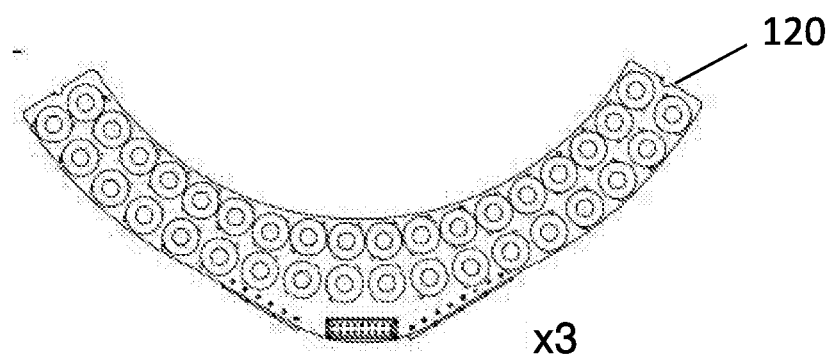
FIGS. 3 and 4 show a portion of an imaging light source according to an embodiment of the invention.
Figure 4:
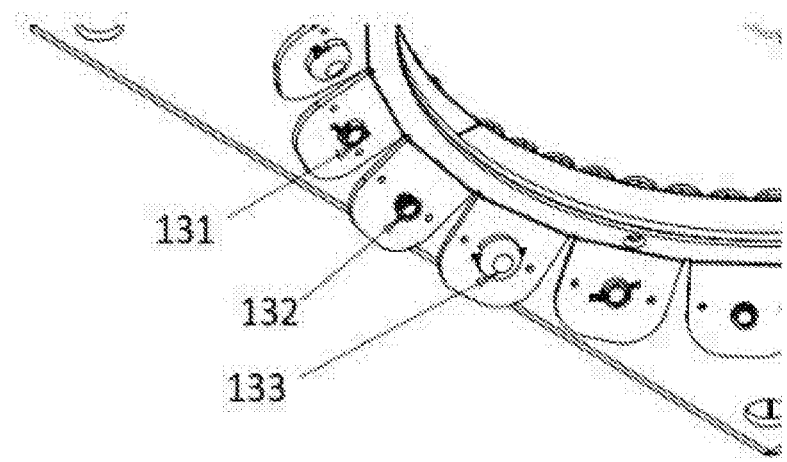

In one embodiment, the imaging light source 120 comprises an array of narrowband light sources. Each imaging light source in the array may be an LED light source. Each imaging light source may be arranged to emit light predominantly toward an interior of the cavity 110. Each imaging light source may be associated with a respective lens. In one embodiment, the lens is arranged to emit light from the light source in a cone of a predetermined angle, such as 120°, or greater. The imaging light sources may be located singularly, or in equidistant multiples, on a support around a periphery of the cavity 110. The support may be, for example, a planar disc-shaped Printed Circuit Board (PCB) sized to fit just in-board of the circumference of the hemisphere's 110 major opening, such that the LEDs face up into the hemisphere 110. FIG. 3 illustrates a portion of the imaging light source 120.

The imaging light source 120 may be arranged to emit light in a selected one of more than 25 wavelength ranges in some embodiments. In one embodiments, the imaging light source may selectively emit light in 35 wavelength ranges, although other numbers of wavelength ranges may be used. In one embodiment each wavelength range is around 10 nm. The wavelength range may be determined as a full width half maximum (FWHM), such as of ~10 nm. The overall imaging wavelength range may be 400-980 nm, within which the selectable imaging wavelength ranges may be evenly spaced. The imaging light source 120 provides for actively illuminated multispectral imaging of the plant 200.

The apparatus 100 comprises one or more object information (OI) light sources generally denoted as 130 in FIG. 1. Some embodiments comprise a plurality of OI light sources. The OI light sources 130 may be distributed around the cavity 110 as shown in FIG. 1. The OI light sources 130 may comprise a plurality of different types of OI light source, as will be explained. In some embodiments the plurality of types of OI light sources 130 are alternately arranged around the cavity 110. The OI light sources 130 may comprise one or more of photometric stereo (µS) light source 131, structured light source 132 and fluorescence light source 133, only one of each of which is identified with a reference numeral in the Figures for clarity. The OI light sources 130 may be arranged around or proximal to a rim of the cavity 110 i.e. around an opening of the cavity 110 as shown particularly in FIG. 2a.

The OI light sources 130 may be arranged to direct illumination downward with respect to the cavity 110. In some embodiments, the OI light sources 130 are mounted on an underside of the PCB supporting the imaging light source 120.

Although in FIGS. 1-4, the PS light source 131 and structured light source 132 are formed as part of the OI light source 130, one or both of the PS light source 131 and structured light source 132 may be separate from the OI light source 130. In some embodiments, one or both of the PS light source 131 and the structured light source 132 may be arranged around the cavity 110 other than at the rim or opening of the cavity 110. The structured light source 132 may be arranged distal from the rim within the cavity 110. In some embodiments, the structured light source 132 is arranged closer to the imaging device 140 than the rim. The structured light 132 source may be arranged around the imaging device 140.

Figure 2A:
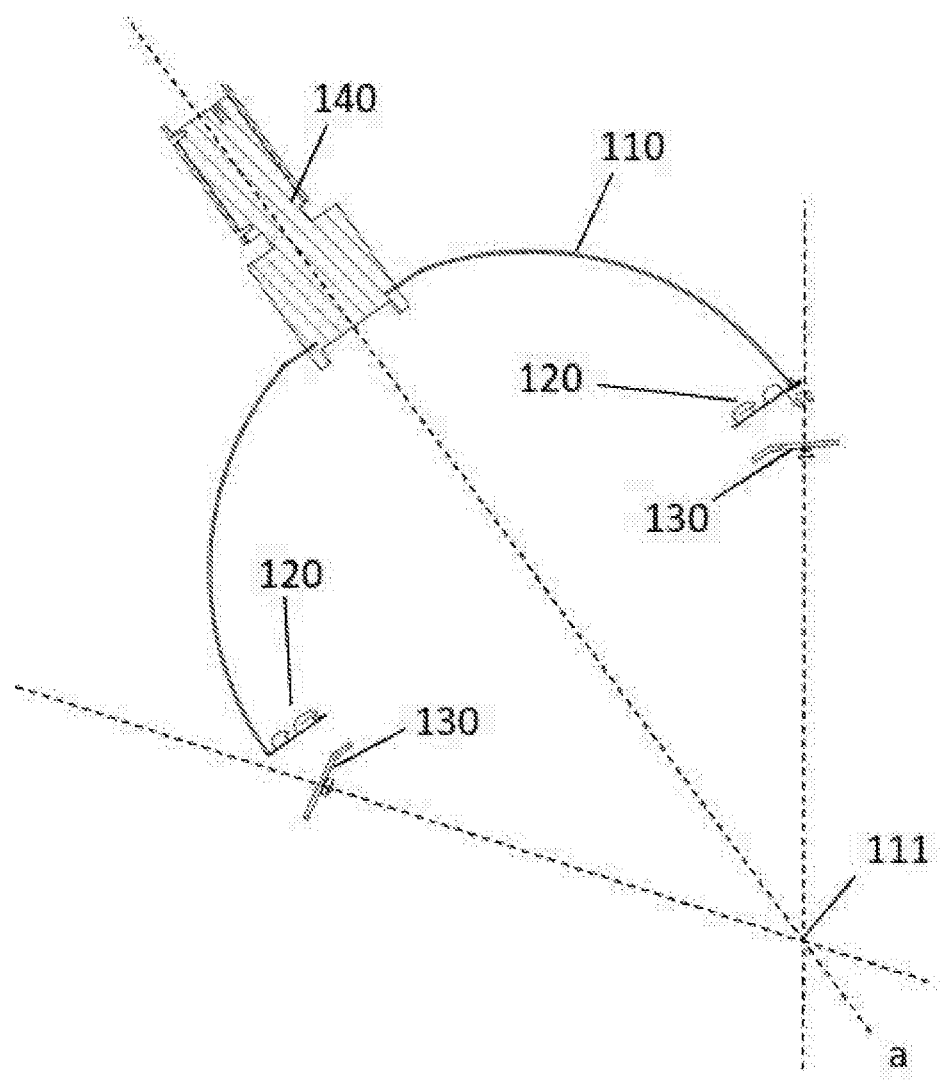
FIG. 2a shows a cross-sectional view of an apparatus according to an embodiment of the invention.
Figure 2B:
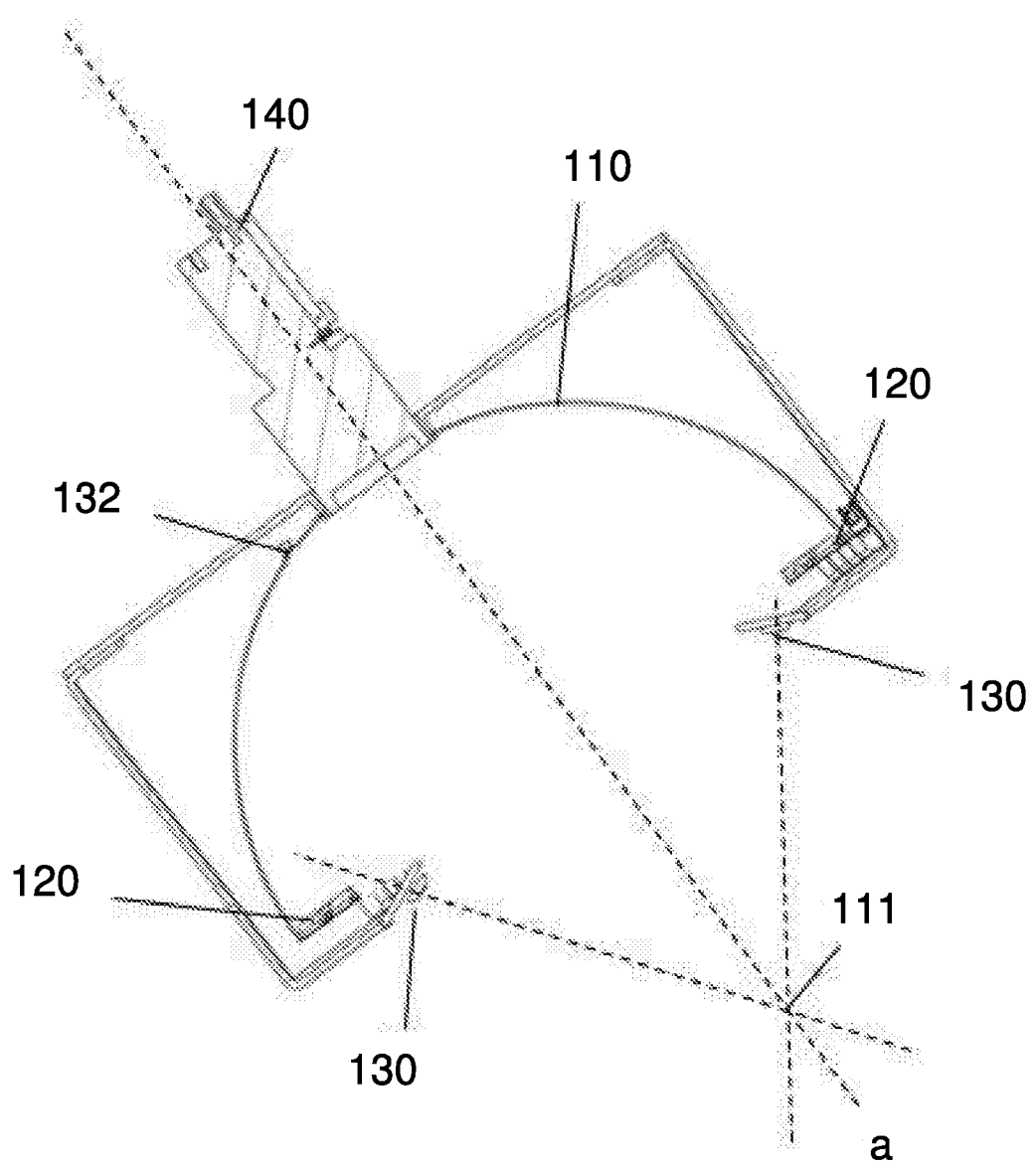
FIG. 2b shows a cross-sectional view of an apparatus according to an embodiment of the invention.

FIG. 2b illustrates an apparatus according to another embodiment of the invention. The structured light source 132 is separate from the OI light source 130 and is arranged closer to the imaging device 140 than the rim of the cavity 110. The structured light source 132 is separate from the PS light source 131 which may be arranged around the rim of the cavity 110. The OI light sources 130 may be distributed around the cavity 110. In some embodiments, the OI light source 130 may be arranged around the inside of the rim of the cavity 110, as shown in FIG. 2b.

The PS light source 131 comprises a plurality of PS light sources 131 distributed radially around the plant 200. In some embodiments, the PS light source 131 comprises three or more PS light sources 131. The plurality of PS light sources 131 are distributed around a periphery of the cavity 110 such that the plant 200, when located generally centrally beneath the cavity 110, may be selectively illuminated from a plurality of different angles. In this way, as will be explained, the apparatus 100 allows photometric stereo imaging of the plant 200.

Each PS light source 131 may be associated with a respective lens. The lens is provided to cause the respective PS light source 131 to form a point source of light. The PS light source 131 may be orientated inwardly towards a centre-line of the hemisphere 110 (item 'a' as shown in FIG. 2a) at a point projected orthogonally down from that centre-line as defined by the focal point of the imaging device 140. The PS light sources 131 may be generally infrared wavelength LEDs (940 nm or similar). An infrared PS light source 131 may be preferred due to the high reflectivity of plant tissue at wavelengths longer than far red (i.e. ~700 nm) as well as the greater penetration depth into the plant tissue attained at the longer wavelengths, providing improved image contrast. The PS light sources 130 are provided for selectively illuminating the plant 200 with illumination from different angles around the cavity 110. Using the PS light sources 131, one or more surface normals may be determined for the plant 200 as will be explained. Each surface normal represents a respective angle of a portion of the plant's surface, such as a leaf.

As noted above, plants often exhibit non-Lambertian reflectance. In order to utilise a photometric stereo imaging method with such a non-Lambertian surface in some embodiments a reflectance model incorporating the non-Lambertian reflectance may be used. Such a reflectance model may be a Torrance-Sparrow model. Use of such a reflectance model allows photometric stereo imaging of surfaces which at least partly exhibit non-Lambertian reflectance. In other embodiments photometric stereo imaging of non-Lambertian surfaces may be achieved by use of additional light sources. With a surface exhibiting Lambertian reflectance photometric stereo may be used with three lights. However, in some embodiments with the PS light source 131 including more than three light sources, such as six light sources, photometric stereo may be used with non-Lambertian surfaces. In some embodiments, a subset of images captured with the six or more PS light sources 131 is selected for use with the photometric stereo method.

The use of photometric stereo imaging, alongside actively illuminated multispectral imaging, enables the orientation (surface normals) of each point in the image data to be determined. However it is not possible to determine information on the absolute distance to the plant 200.

The structured light source 132 is provided for emitting structured illumination toward the object 200. By structured light it is meant that the illumination falling on the plant 200 has a predetermined structure. The structure enables distance information indicative of a distance to the plant 200 to be determined. Structured light offers the opportunity to gain depth information using only one imaging device 140.

The structured light source 132 may comprise one or more sources of structured light. In the illustrated embodiment, the structured light source 132 comprises a plurality of structured light sources 132 distributed around the cavity 110. However, in other embodiments, the structured light source 132 may be located elsewhere about the apparatus 100. For example, the structured light source 132 may comprise one structured light source which may be located proximal to the imaging device 140.

Each structured light source 132 may be a source of coherent light. In some embodiments each structured light source 132 may be a semiconductor light source, such as a laser diode. Each structured light source 132 may be associated with a device for imparting structure to the light from the structured light source 132. In some embodiments the device is a diffraction grating. The diffraction grating may be a dual-axis diffraction grating. The diffraction grating may be mounted in front of structured light source 132 i.e. mounting in front of each laser diode. The diffraction grating projects a regular pattern of dots in a grid arrangement, with a spacing dictated by the wavelength of the laser diode(s), assuming a fixed diffraction grating line spacing.

Figure 5:
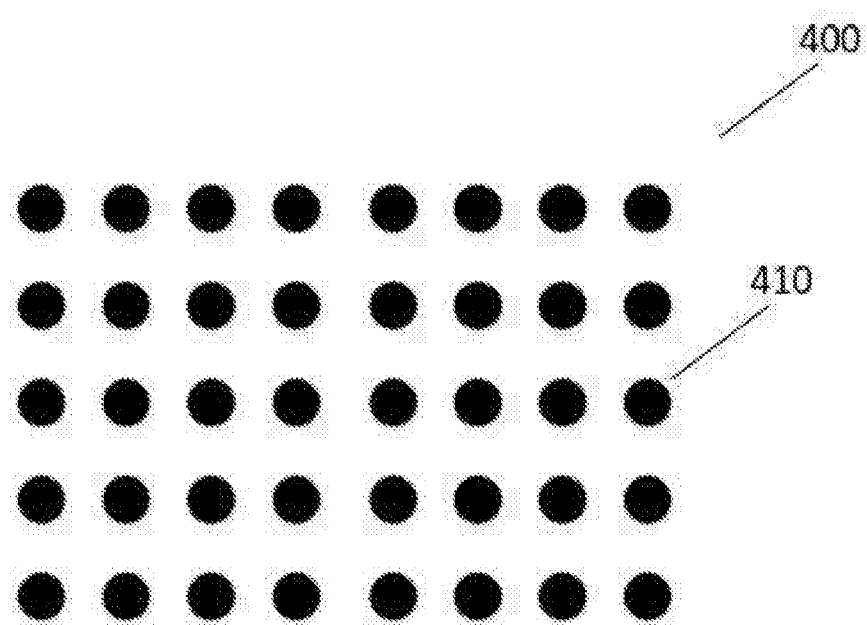
FIG. 5 shows an example of structured illumination according to an embodiment of the invention.

FIG. 5 illustrates an example of structured light 400 which may fall on the plant 200 in an embodiment of the invention. The structured light in the illustrated embodiment comprises a plurality of dots 410 in the grid arrangement spaced in x and y directions. Thus the structured light may form a mesh pattern on the plant 200.

The fluorescence light source 133 may comprise a plurality of fluorescence light sources 133. The fluorescence light source 133 may be provided for emitting light having a short duration and high-intensity i.e. a flash of fluorescence light. Each fluorescence light source may be an LED. Each fluorescence light source may be associated with a respective lens.

As noted above, the apparatus 100 comprises one or more imaging devices 140. The one or more imaging devices 140 are arranged to generate image data relating to at least a portion of the object. The one or more imaging devices may comprise one or more cameras. In the illustrated embodiment, the apparatus comprises one camera and a lens assembly, together referred to as 140. The camera and lens assembly 140 is located on a centre-line of the hemisphere (a' illustrated in FIG. 2a). The assembly 140 is and positioned to capture images through a hole in of the hemisphere 110. A focal distance of the lens may be set to a mean orthogonal distance to the object and a depth of field (i.e. lens aperture setting) to accommodate a depth range of the object 200 to be investigated, such as the plant 200. In some embodiments an imaging array, such as a CCD, in the camera assembly 140 uses a global shutter for rapid full-frame capture, which may assist in reducing a potential for 'multispectral cube' construction errors associated with significant image movement whilst capturing the individual wavelength elements of the multispectral cube, as will be explained. The one or more imaging devices 140 are broadband imaging devices i.e. which captures illumination over a wide range of wavelengths.

Figure 11:
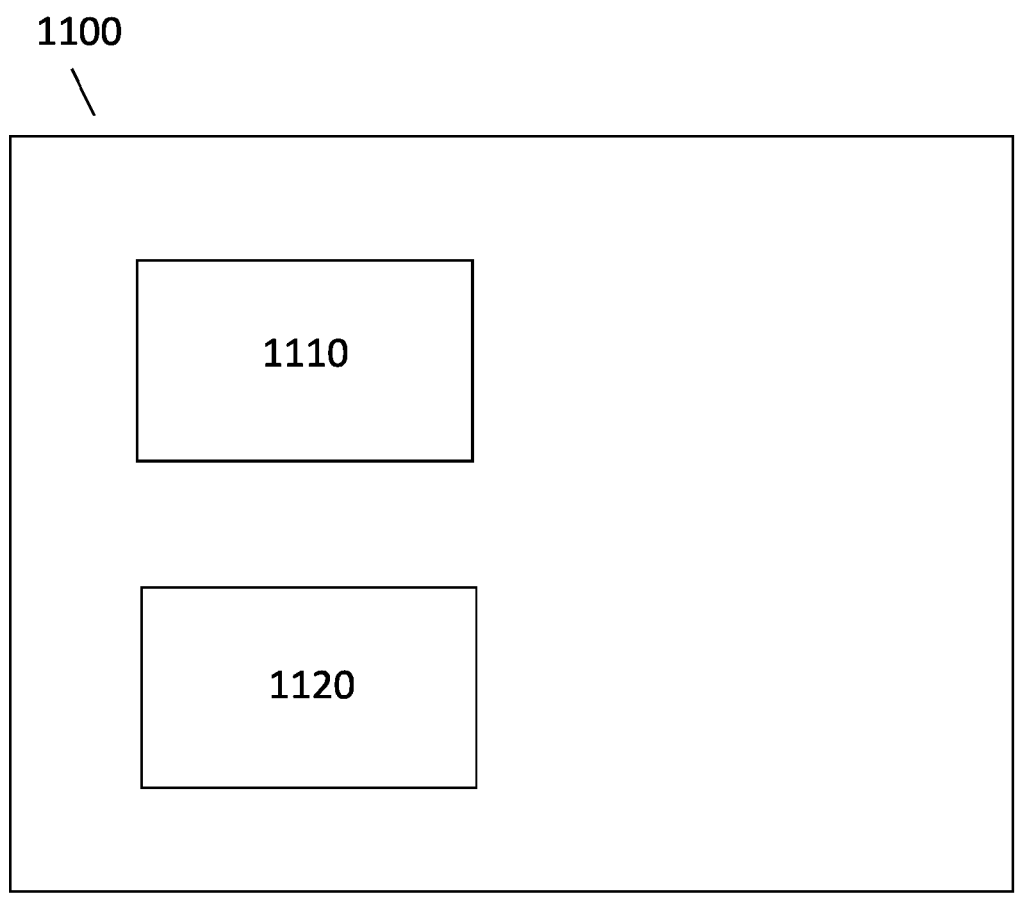
FIG. 11 shows a schematic illustration of a control unit according to the present invention.

The apparatus 100 comprises a control unit 1100 and a data storage unit 1120 as shown in FIG. 11 and described below. The control unit 1100 is provided to control operation of the apparatus 100. The control unit 1100 is communicatively coupled to the imaging light source 120, the OI light sources 130 and the one or more imaging devices 140.

The control unit 1100 is arranged to, in use, control the imaging light source 120 to emit light in a selected one of the plurality of imaging wavelength ranges. The control unit is operable to control the one or more imaging devices 140 to capture image data corresponding to the emitted wavelength range. The data storage 1120 unit receives the image data from the one or more imaging devices 140 and stores the image data at the selected imaging wavelength in one imaging cycle. By performing imaging cycles at each of a plurality of imaging wavelengths multispectral image data is obtained. By controlling the wavelength of emitted imaging illumination and the image data captured by the imaging device 140, the control unit 1100 causes the data storage unit 1120 to store the multispectral cube of multispectral image data. The multispectral cube is formed by image data in first and second axes i.e. x, y axes corresponding to a spatial area of the plant and image data in a third axis corresponding to wavelength.

The control unit 1100 is arranged to control the OI light source 130 to selectively emit one or more of PS light 131, structured light 132 and fluorescence light 133. In the case of PS light, the control unit 1100 further selects one of the PS light sources to emit light for determining the surface normals.

Figure 6:
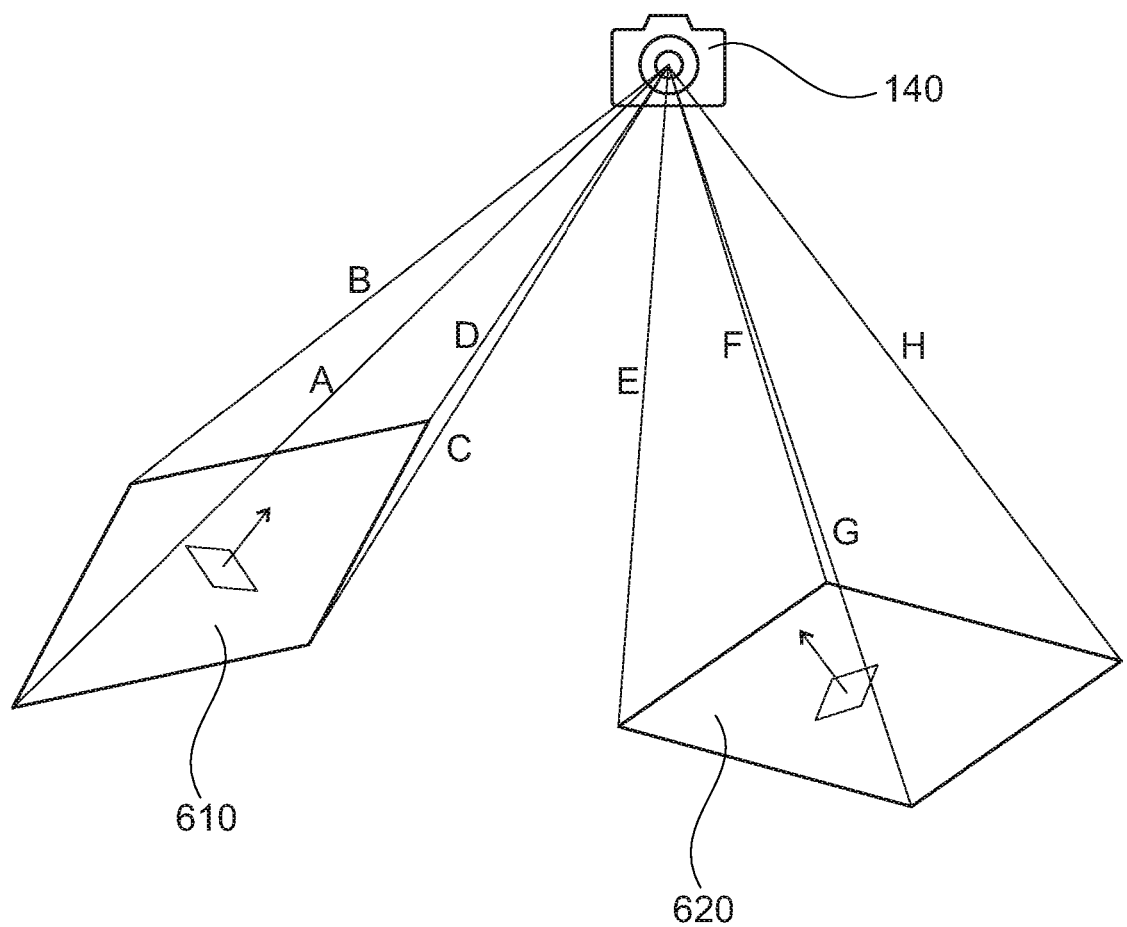
FIGS. 6 and 7 schematically illustrate operation of an embodiment of the invention.

Referring to FIG. 6, first and second planar surfaces in the form of plant leaves 610, 620 are illustrated. It can be appreciated that the leaves 610, 620 are at different orientations and distances from the imaging device 140. FIG. 6 illustrates a distance between the imaging device 140 and a plurality of points on each leaf, with each distance being indicated by a respective line denoted A-H. Such differing distances may impact upon an ability to effective utilise multispectral image data for the leaves 610, 620. Embodiments of the invention determine a distance between the imaging device 140 and respective points on the leaves 610, 620 such as corresponding to A-H using the structured illumination 400.

Figure 7:
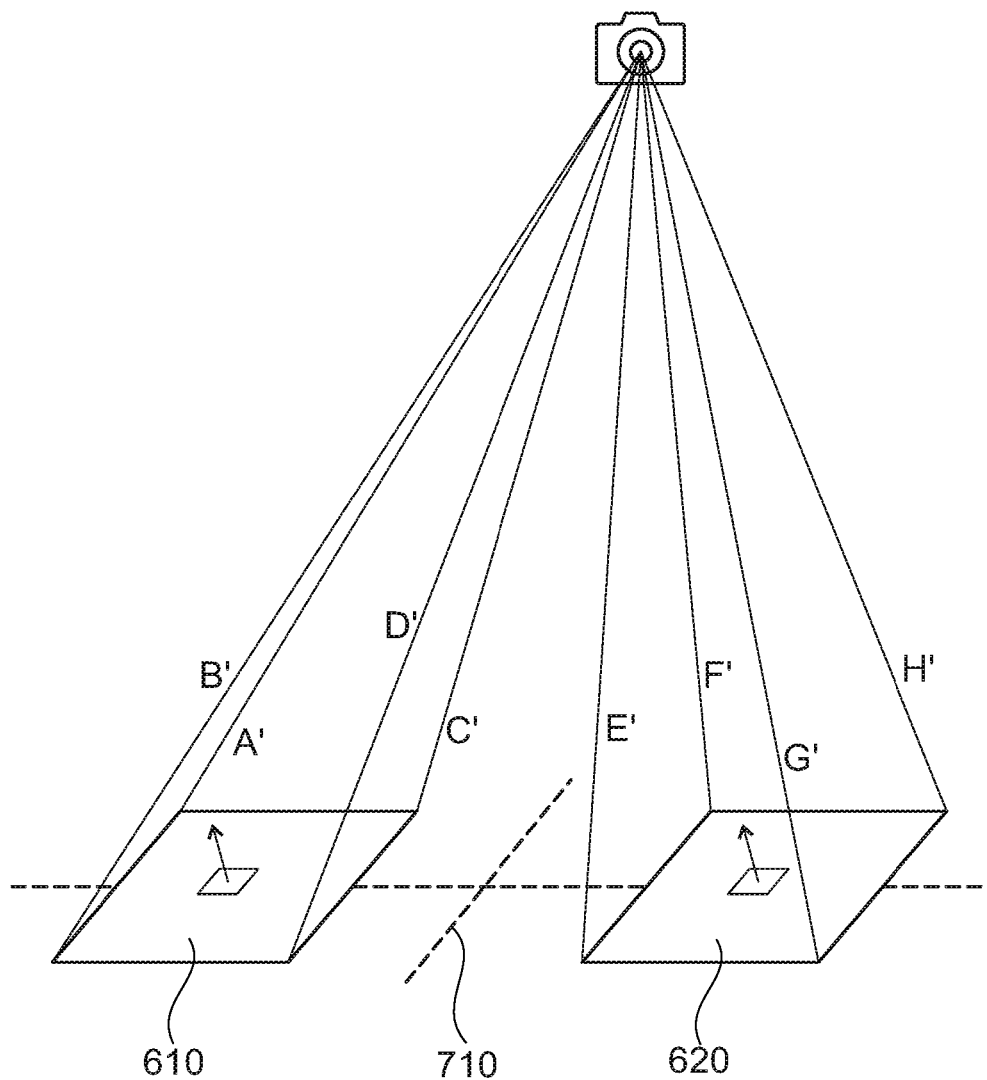

Embodiments of the invention calculate distance information corresponding to distances to the surface, for the pixels in the image data, where the structured illumination is projected. That distance information may then be used to produce a normalised 'multispectral cube', as illustrated in FIG. 7. That is, to correct for an intensity of light received, at the corresponding pixels in the image data, to what would have been received if the object such as the leaves 610, 620 were flat, i.e. at a fixed distance A' from the imaging detector as opposed to the actual distance A (or B through to H as in FIG. 6).

A conversion from A to A' may be determined using the Inverse Square Law, i.e.: Required Intensity at distance A'=Actual Sensed Intensity at distance $A*(A'^2/A^2)$.

Figure 8:
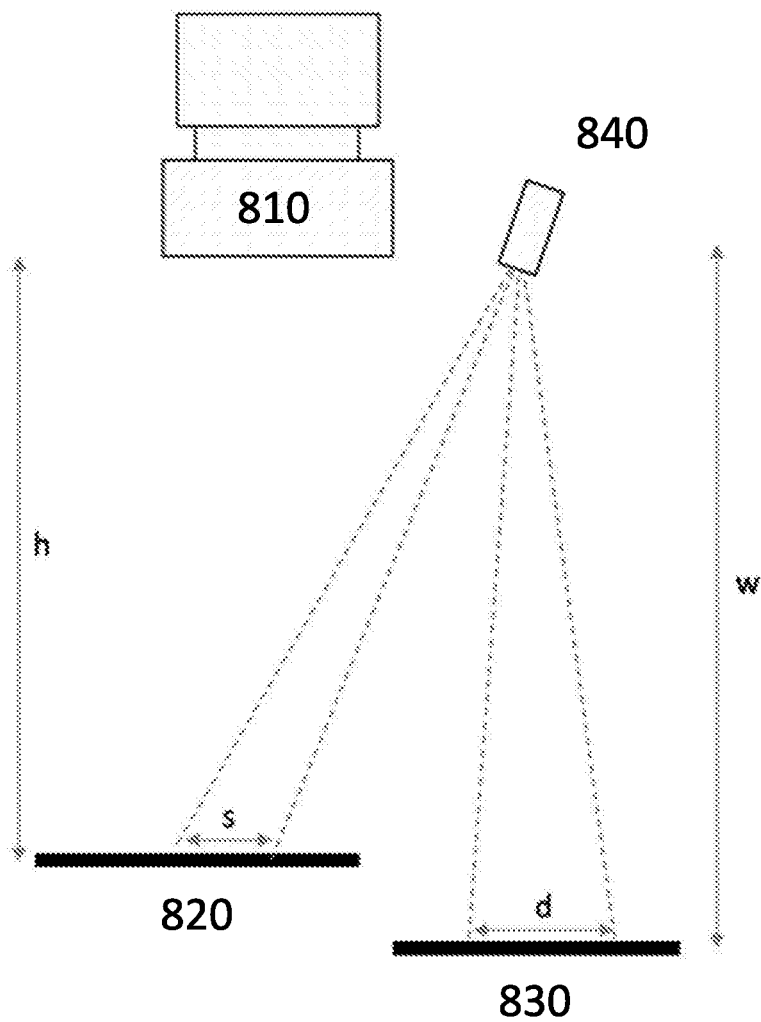
FIG. 8 shows an example of illumination of surfaces according to an embodiment of the invention.

Referring to FIG. 8, an imaging device 810 and two example surfaces, 820, 830, illuminated by structured light from a structured light source 840, are illustrated. Surfaces 820, 830 are each located at different distances from the imaging device 810. The structured light source 840 projects a diverging structured pattern, such as a grid pattern, onto the surfaces 820, 830. A first surface 820 is located at a first height h and a second surface 830 is located at a second height w.

A spacing of the grid of the light reflected from the first surface 820 is indicated as s in FIG. 8. A spacing of the grid of the light reflected from the second surface 830 is indicated as d in FIG. 8. The distance of the surfaces 820, 830 from the imaging device 810 are respectively indicated as h and w, respectively, on FIG. 8. The distance of the surfaces 820, 830 from the imaging device 810 is the depth information obtained using the structured light.

The values of s and d are related to the h and w by constant k. The value of the constant k is dependent upon the wavelength of the structured light and the diverging structured pattern.

The constant 'k' may have the units of mm/pixel and 's' and 'd' may be determined in units of pixels. Therefore, the depth, 'h' and 'w', of surfaces 820, 830, respectively, from the imaging device 810 may be determined using the equations:

$$h = k*s$$

$$w = k*d$$

Embodiments of the invention may comprise processing means which may be arranged to determine the depth information relating to at least a portion of the object, such as leaves 610, 620 of the plant 200. The depth information is determined in dependence on the image data corresponding to the structured illumination stored in the data storage means.

FIG. 11 illustrates a control unit 1100 according to an embodiment of the invention. The control unit 1100 comprises processing means 1110 and a memory 1120. The processing means 1110 may comprise one or more processors or electronic processing devices arranged to determine the depth information. The one or more processors may execute computer-readable instructions to determine the depth information. The memory 1120 is arranged to store computer readable code that may be executed by the processor 1110. The control unit 1100 may be arranged to control the structured light source 132 to emit the structured illumination and to control the imaging light source 120 to emit light in a selected one or more of the plurality of wavelength ranges.

In some embodiments, the processing means is arranged to combine data relating to the PS light 131 and the structured light 132. The processing means may combine the data relating to the PS light 131 and the structured light 132 to determine information about the plant 200 between structured illumination falling on the plant 200 i.e. between the dots 410 illustrated in FIG. 5.

In order to determine texture information relating to the plant 200 for the locations between the dots 510 or vertices of the coded-light mesh, embodiments of the invention use the dots 510, such as the mesh pattern of illumination, from structured light 132, and integrates that with the Photometric Stereo (PS) reconstruction approach, from additional point sources of illumination i.e. the PS light 131. The processing means may determine an absolute distance between the 3D object, such as the plant 200, under investigation, and the imaging device 140 at the dots 510 or structured light vertices, and then calculating a relative surface topology, between those vertices, through the photometric stereo reconstruction.

Figure 9:
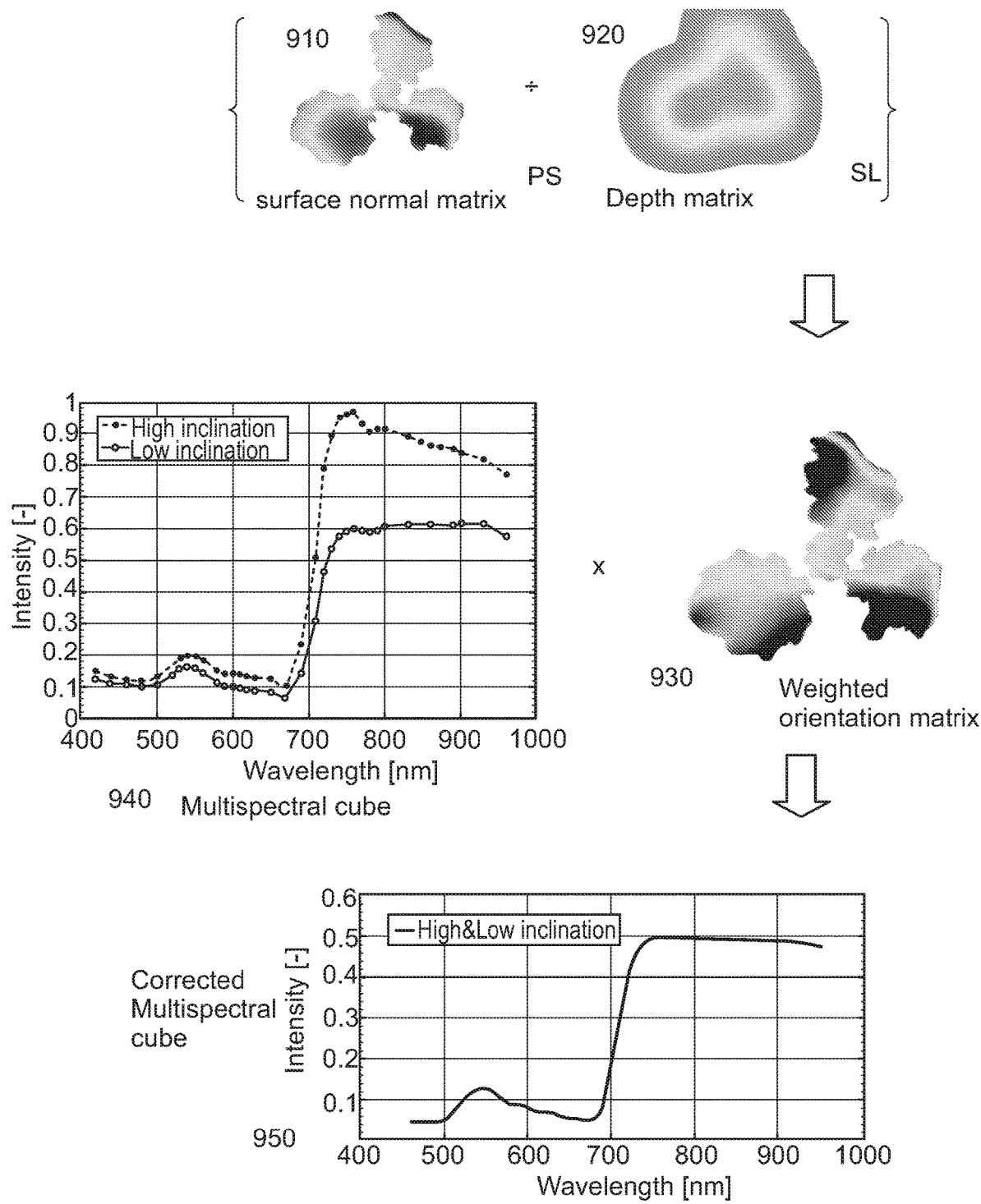
FIG. 9 shows how a corrected multispectral cube is obtained from a multispectral cube according to an embodiment of the invention.

FIG. 9 illustrates how a corrected multispectral cube 950 containing corrected multispectral image data is obtained from a multispectral cube 940 using the information from the photometric stereo and structured light according to an embodiment of the invention. The multispectral cube 940 contains image data in first and second axes, such the x and y axes corresponding to a spatial area of the object, such as the plant, and image data in a third axis corresponding to wavelength. A surface normal matrix 910 is obtained from the projected photometric stereo light. The surface normal matrix contains direction and texture information of the surface of the illuminated object. A depth matrix 920 contains the depth information obtained from the projected structured light. The surface normal matrix 910 and the depth matrix 920 are processed together. In some embodiments, the surface normal matrix 910 is divided by the depth matrix 920 to negate the effect of bending artefacts which limit photometric stereo reconstruction. Bending artefacts are due to the degradation in reflectance, introduced when a non-ideal point source of light is used, such as an LED. A matrix resulting from the processing is a weighted orientation matrix 930. The weighted orientation matrix 930 contains direction and texture information of the surface of the illuminated object following corrections made for the depth information obtained using the structured light.

The multispectral cube 940, which is stored in the data storage unit, comprises individual wavelength elements from the multispectral image data. Each wavelength element of the multispectral cube is corrected according to the weighted orientation matrix 930. In some embodiments, each wavelength element of the multispectral cube is multiplied by the weighted orientation matrix 930. The effect of multiplying each individual wavelength element of the multispectral cube by the weighted orientation matrix 930 is to correct the multispectral image data by a shift factor according to the orientation and depth of the imaged object. Surfaces at a large angular offset to the plane perpendicular to the imaging device 140 have a reduced apparent intensity in the multispectral cube. Therefore, to correct for this, when the multispectral cube is multiplied by the weighted orientation matrix, a higher shift factor is applied to the intensities of surfaces at a large angular offset. Surfaces at an angular offset closer to the plane perpendicular to the imaging device 140 have an apparent intensity that is more accurate to their actual intensity than those of the surfaces at large angles. Therefore, the intensities of the surfaces at a smaller angular offset are multiplied by a smaller shift factor in order to minimise the distortion of their corresponding intensities.

Figure 10:
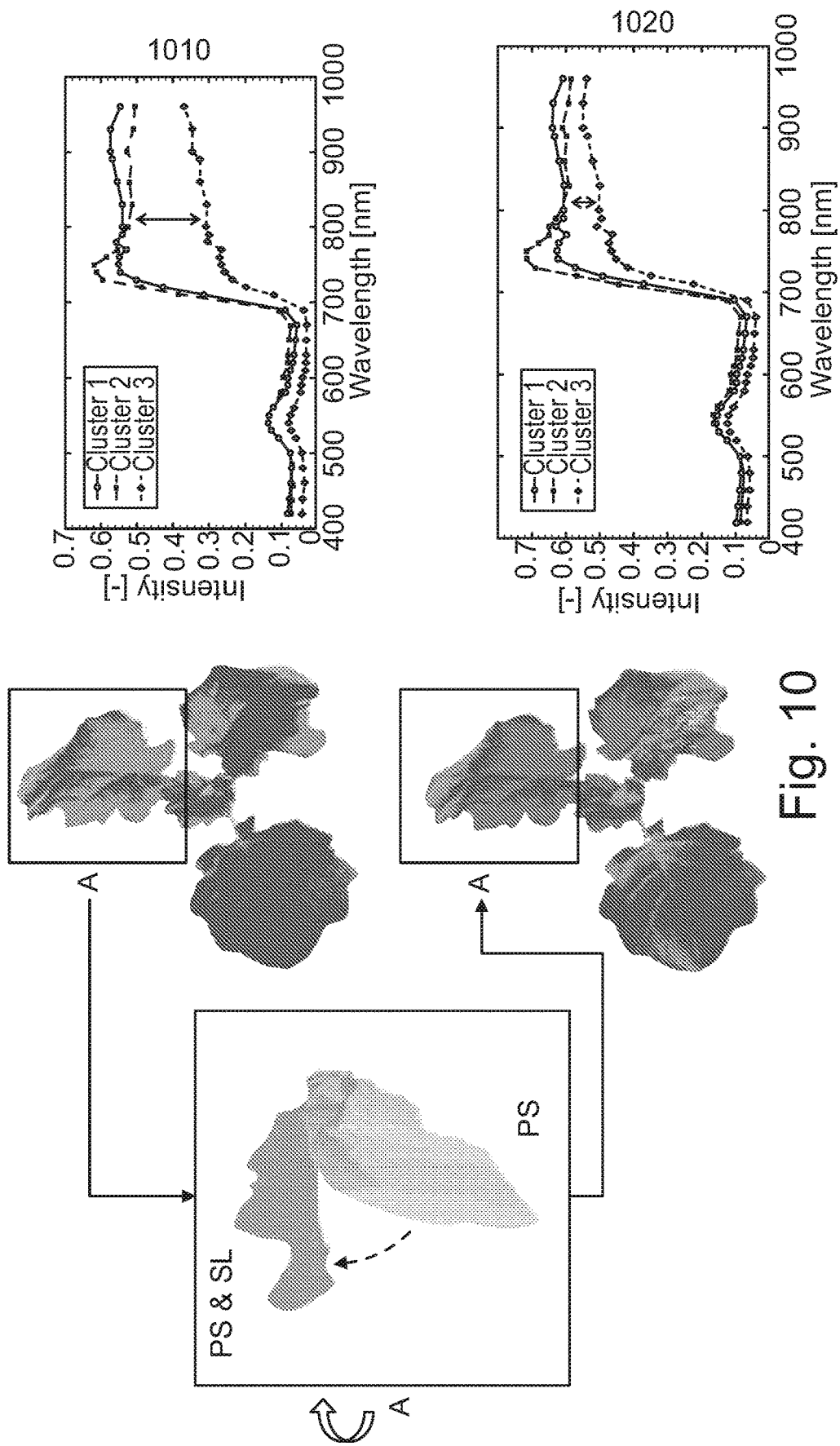
FIG. 10 shows an example of how structured light and photometric stereo light can be applied to perform a surface correction of multispectral image data of a leaf according to an embodiment of the invention.

FIG. 10 illustrates an example of how structured light and photometric stereo light can be applied to perform a surface correction of multispectral image data of an object, such as a leaf. FIG. 10 also illustrates graphs 1010, 1020 which represent the intensity of different clusters at particular wavelengths. The clusters are regions of the leaf with the same intensity which are grouped together in dependence on one or more properties, such as because they have similar reflectance properties. The double-sided arrows in graphs 1010, 1020 represent the reflection variability within the leaf due to the different angles of the leaf at different spatial points. The smaller arrow in graph 1020 demonstrates an improvement in reflection variation between cluster from graph 1010. The reflection variation occurs because plant material is translucent, and therefore it absorbs and reflects different wavelengths of light at varying magnitude. This results in a non-Lambertian reflectance model that varies with wavelength. The reflection variation can be changed by applying an additional weighting differential to the weighted orientation matrix. The greater the shift factor applied to correct the orientation of a particular point on the leaf, the less detectable small changes in reflectance are. Small changes in the reflectance may be indicative of plant disease. Therefore, it is important to achieve a compromise between the surface correction and potential over-compensation that may result in lost information.

In this way, a distance of at least some, or each and every, individual image-pixel from the imaging device 140, across the object's surface, may be rapidly determined through a reduced number of image frames than are required for coded structured light alone. That is, 1 image from the relatively course structured light 132 mesh and a small number, such as 3, from the PS light 131, with differing point illumination points located on the circumference of a circle centred around the imaging device 140 and in the same plane, i.e. 4 images in total, are adequate to generate the required absolute measurements across the whole of the imaged surface, such as the leaves 610, 620. In some embodiments a further fourth image, i.e. 5 in total, are used to compute the PS, with the point sources at the vertices of a square again located on the circumference of a square centred around on the same plane as the imaging device 140. This enables a degree of redundancy to be incorporated, into the relative surface topology reconstruction, which reduces the potential errors from noise.

The requirement for 4 or 5 frames for absolute surface characterisation compares to $\log_2(X)$ images to obtain similar data from coded structured light alone, where X is a number of pixels in the horizontal or vertical direction, whichever is the greater. That is, if the image were rectangular, then X is the number of pixels that makes up the largest length, e.g. 2048 in the case of a 2048×1536 aspect ratio image. The latter example would then result in 11 individual images being required from coded structured light alone versus 4, or 5 (with redundancy), for a hybrid photometric stereo 131 and structured light 132 system. An additional time penalty in taking the extra frames required for the structured light system alone, and then reconstructing the data from that, are punitive versus the hybrid PS and structured light approach. This is because for every multi-spectral frame captured, typically comprised of 4-16 single images at differing wavebands for a system operating in the Visible to Near-Near-Infrared region of the spectrum (400-1100 nm), the surface topology must also be calculated to enable quantitative modelling of the MSI data.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An apparatus for determining spectral information of a three-dimensional object, comprising:
a cavity for location in relation to the object;
an imaging light source facing the cavity, the imaging light source controllable to selectively emit light in a plurality of wavelength ranges;
a structured light source configured to emit structured illumination toward the object, the structured light source including a plurality of illumination devices arranged around the cavity with one or more of the plurality of illumination devices arranged in relation to at least one illumination structuring device, each of the plurality of illumination devices being a coherent illumination device;
a photometric stereo (PS) light source facing away from the cavity and configured to selectively emit a point source of light toward the object from different radial angles around the object for PS imaging to determine surface normals relating to at least a portion of the object;
one or more imaging devices for generating image data relating to at least a portion of the object;
a controller including one or more processors, a data storage device being a memory storing computer readable instructions which, when executed by the one or more processors, cause the one or more processors to:
control the structured light source to emit the structured illumination;
control the PS light source to emit the illumination toward the object from the different radial angles around the object;
control the imaging light source to emit light in a selected one or more of the plurality of wavelength ranges;
store image data in the data storage device corresponding to the structured illumination, the illumination emitted toward the object by the PS light source, and each of the selected one or more of the plurality of wavelength ranges;
determine depth information relating to at least a portion of the object in dependence on the image data corresponding to the structured illumination stored in the data storage device; and
determine the surface normals each representing a respective angle of a portion of a surface of the object in dependence on the illumination emitted toward the object by the PS light source.

2. The apparatus of claim 1, wherein the at least one illumination structuring device includes a diffraction grating.

3. The apparatus of claim 1, wherein each illumination device of the plurality of illumination devices is associated with a respective illumination structuring device.

4. The apparatus of claim 3, wherein each illumination device of the plurality of illumination devices is directed inward toward a central axis of the cavity.

5. The apparatus of claim 1, wherein each of the plurality of illumination devices is a laser diode.

6. The apparatus of claim 1, wherein the PS light source includes a plurality of light emitters arranged around the cavity.

7. The apparatus of claim 1, wherein the memory stores further computer readable instructions, which, when executed by the one or more processors, cause the one or more processors to:
determine the depth information in dependence on an inverse square law.

8. The apparatus of claim 1, wherein the memory stores further computer readable instructions, which, when executed by the one or more processors, cause the one or more processors to:
correct the image data corresponding to the selected one or more of the plurality of wavelength ranges in dependence on the depth information.

9. The apparatus of claim 8, wherein the computer readable instructions executed by the one or more processors to correct the image data further cause the one or more processors to:
determine the image data for each of the selected one or more of the plurality of wavelength ranges at a given distance A' according to: $A*(A'^2/A^2)$, where A is an actual imaged distance.

10. The apparatus of claim 1, wherein the memory stores further computer readable instructions, which, when executed by the one or more processors, cause the one or more processors to:
  determine the depth information according to $h=k*s$, wherein 's' is a spacing of a structured pattern of the image data corresponding to the structured illumination, 'h' is the depth information and 'k' is a constant.

11. The apparatus of claim 1, wherein the memory stores further computer readable instructions, which, when executed by the one or more processors, cause the one or more processors to:
  store a multispectral cube of the image data in the data storage device.

12. The apparatus of claim 11, wherein the multispectral cube is comprised of a plurality of wavelength ranges, wherein each one of the plurality of wavelength ranges corresponds to an individual wavelength element.

13. The apparatus of claim 12, wherein the memory stores further computer readable instructions, which, when executed by the one or more processors, cause the one or more processors to:
  determine a depth matrix in dependence on the depth information.

14. The apparatus of claim 13, wherein the memory stores further computer readable instructions, which, when executed by the one or more processors, cause the one or more processors to:
  determine a surface normal matrix in dependence on illumination emitted toward the object by the PS light source.

15. The apparatus of claim 14, wherein the memory stores further computer readable instructions, which, when executed by the one or more processors, cause the one or more processors to:
  determine a weighted orientation matrix in dependence on the surface normal matrix and the depth matrix.

16. The apparatus of claim 15, wherein the weighted orientation matrix includes corrected direction and texture information for the object.

17. The apparatus of claim 15, wherein each of the individual wavelength elements of the multispectral cube is multiplied by the weighted orientation matrix.

18. An apparatus for determining spectral information of a three-dimensional object, comprising:
  a housing having a hemispherical cavity and a support extending around a periphery of a major opening of the cavity;
  an imaging light source coupled to the support of the housing and arranged facing the cavity, the imaging light source configured to selectively emit light in a plurality of wavelength ranges into the cavity;
  a structured light source coupled to the support of the housing and configured to emit structured illumination away from the cavity and toward the object, the structured light source including a plurality of coherent illumination devices arranged around the periphery of the major opening cavity with one or more of the plurality of illumination devices arranged in relation to at least one illumination structuring device;
  a plurality of photometric stereo light sources coupled to the support of the housing and arranged facing away from the cavity, the plurality of photometric light sources configured to selectively emit point sources of light toward the object from different radial angles around the object;
  one or more imaging devices configured to capture image data relating to at least a portion of the object;
  a controller including one or more processors, a data storage device being a memory storing computer readable instructions which, when executed by the one or more processors, cause the one or more processors to:
    control the structured light source to emit the structured illumination;
    control the plurality of photometric stereo light sources to emit the point sources of light toward the object from different radial angles around the object;
    control the imaging light source to emit light in one or more of the plurality of wavelength ranges;
    store image data corresponding to the structured illumination, the illumination emitted toward the object by the PS light source, and each of the selected one or more of the plurality of wavelength ranges in the data storage device;
    determine depth information relating to at least a portion of the object in dependence on the image data corresponding to the structured illumination stored in the data storage device; and
    determine surface normals each representing a respective angle of a portion of a surface of the object in dependence on the illumination emitted toward the object by the PS light source.

19. The apparatus of claim 18, wherein the support of the housing is a printed circuit board coupled to the housing and arranged around the periphery of the major opening of the cavity, the imaging light source disposed on a first surface of the printed circuit board facing the cavity and the plurality of photometric stereo light sources disposed on a second surface of the printed circuit board opposite to the first surface and facing away from the cavity.

20. The apparatus of claim 18, wherein each of the plurality of coherent illumination devices is associated with a respective illumination structuring device, each of the respective illumination structuring devices being a diffraction grating.

21. The apparatus of claim 18, wherein the memory stores further computer readable instructions, which, when executed by the one or more processors, cause the one or more processors to:
  store a multispectral cube of the image data in the data storage device including a plurality of wavelength ranges, each one of the plurality of wavelength ranges corresponding to an individual wavelength element;
  determine a depth matrix in dependence on the depth information;
  determine a surface normal matrix in dependence on illumination emitted toward the object by the PS light source;
  determine a weighted orientation matrix in dependence on the surface normal matrix and the depth matrix; and
  multiply each of the individual wavelength elements of the multispectral cube by the weighted orientation matrix.

* * * * *